United States Patent [19]
Knurr

[11] Patent Number: 6,105,660
[45] Date of Patent: Aug. 22, 2000

[54] OIL COOLER MOVABLY SUPPORTED ON A VEHICLE AND METHOD FOR SAME

[75] Inventor: Randal S. Knurr, Waterford, Wis.

[73] Assignee: Textron Inc., Providence, R.I.

[21] Appl. No.: 09/184,148

[22] Filed: Nov. 2, 1998

[51] Int. Cl.[7] .................................................. F01P 7/02
[52] U.S. Cl. .................. 165/41; 165/77; 165/86; 165/95; 165/140; 165/916; 165/67; 180/68.4
[58] Field of Search .................. 165/41, 86, 95, 165/77, 78, 916, 140, 67; 180/68.4; 62/303

[56] References Cited

U.S. PATENT DOCUMENTS

| | | | |
|---|---|---|---|
| 1,495,785 | 5/1924 | Finley et al. . | |
| 2,036,996 | 4/1936 | Bernard . | |
| 2,371,501 | 3/1945 | Burkhardt | 165/41 |
| 2,615,687 | 10/1952 | Simmons | 165/78 |
| 3,297,080 | 1/1967 | Williams et al. | 165/77 |
| 3,334,704 | 8/1967 | Gehrke et al. . | |
| 4,531,574 | 7/1985 | Hoch . | |
| 4,541,645 | 9/1985 | Foeldesi . | |
| 4,696,361 | 9/1987 | Clark . | |
| 5,219,016 | 6/1993 | Bolton et al. | 165/41 |
| 5,237,831 | 8/1993 | Sikora | 165/86 |
| 5,269,367 | 12/1993 | Susa et al. | 165/41 |
| 5,901,786 | 5/1999 | Patel et al. | 165/41 |

*Primary Examiner*—John K. Ford
*Attorney, Agent, or Firm*—Arthur J. Hansmann

[57] ABSTRACT

An oil cooler movably supported on a vehicle, and being in combination with a radiator supported preferably on a tractor. The two exchangers are in tandem position, relative to air flow, and each has it own vertically clear space, and the oil cooler can be moved in its space to an inoperative position and out of tandem so that both the cooler and radiator can be maintained, such as by cleaning. The support for the cooler is shown to be a pivotal support and the hoses remain connected while the cooler is moved, and there is an air filter screen which is also movably mounted in the assembly, and there is a stand for supporting the cooler in its inoperative position.

21 Claims, 5 Drawing Sheets

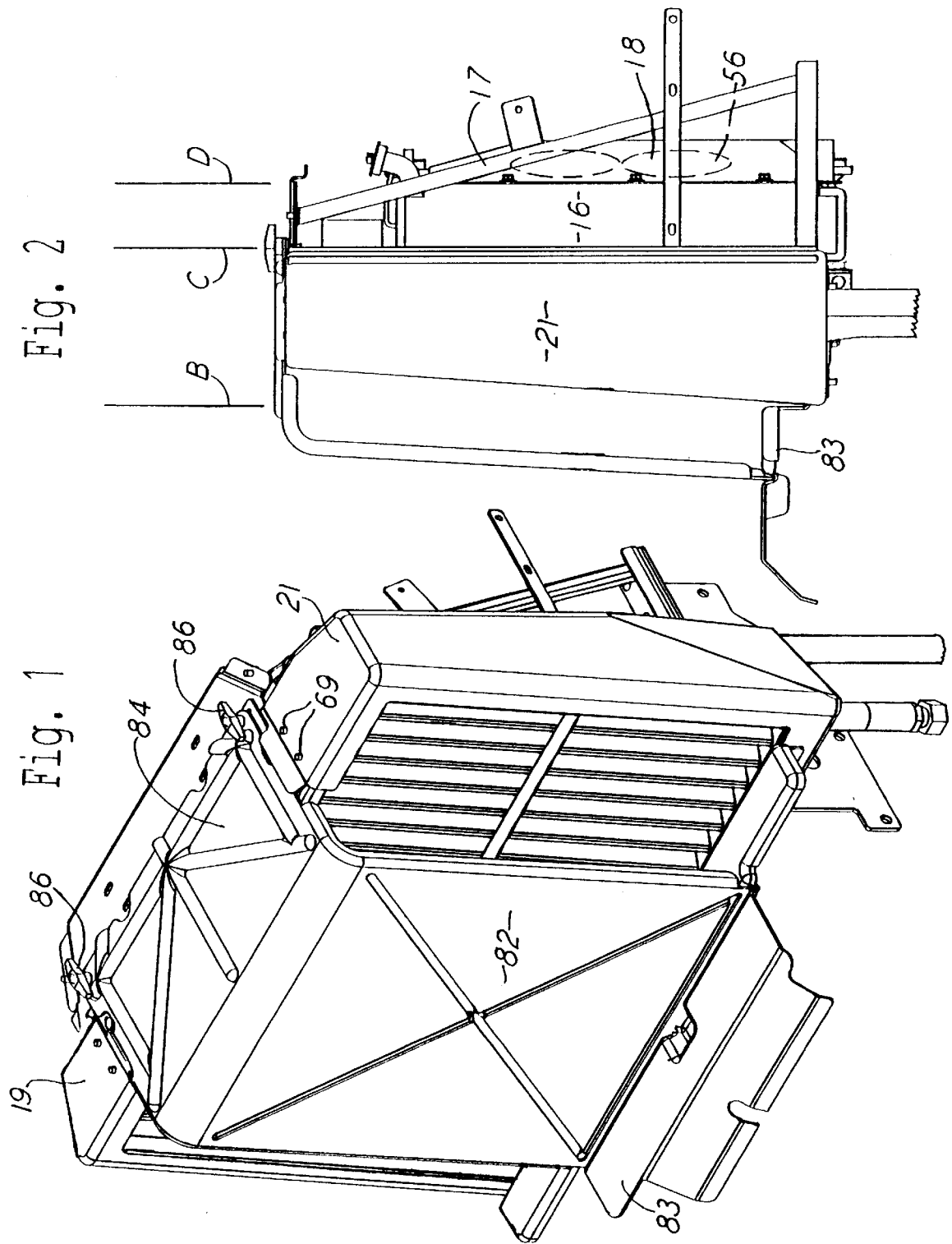

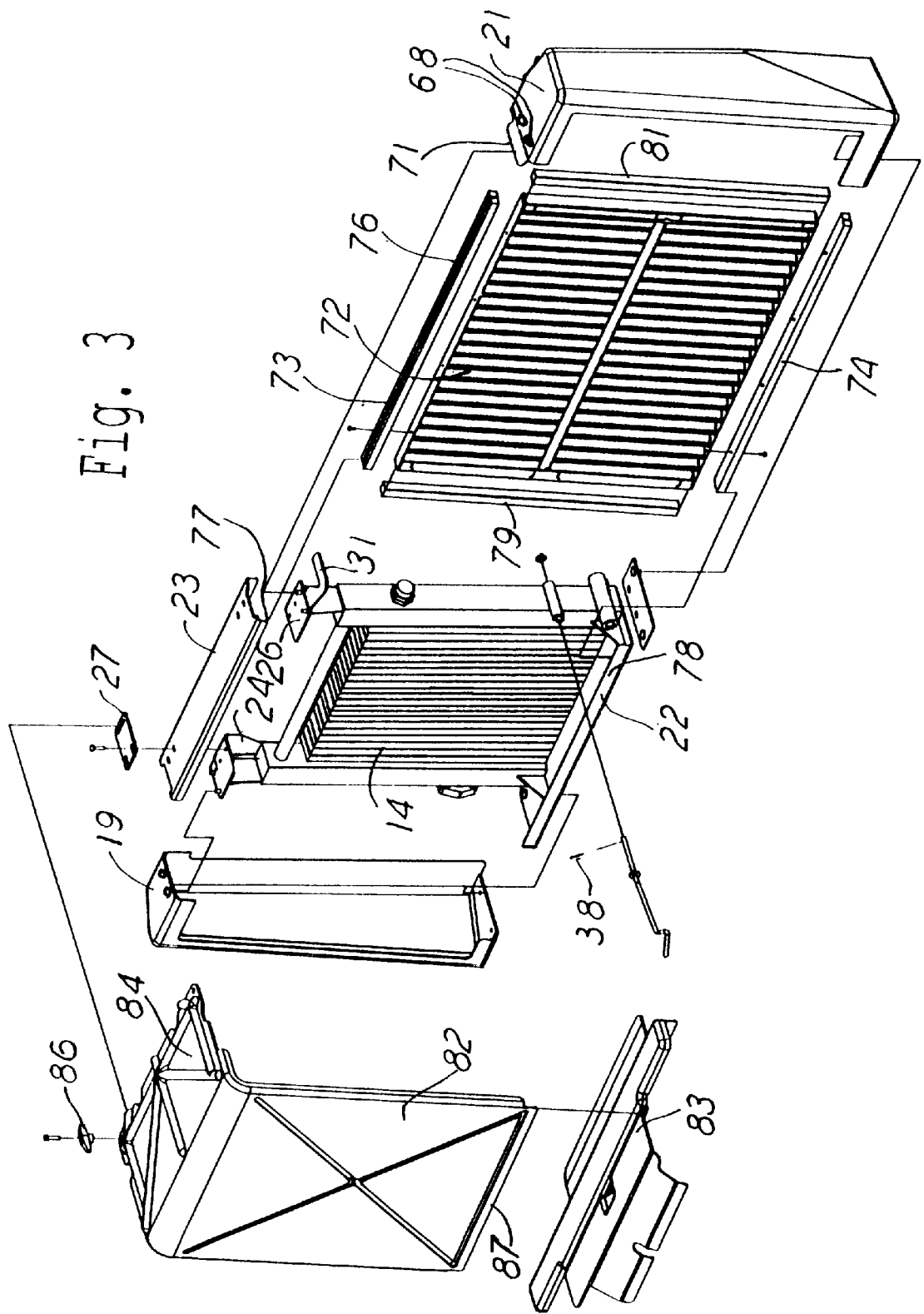

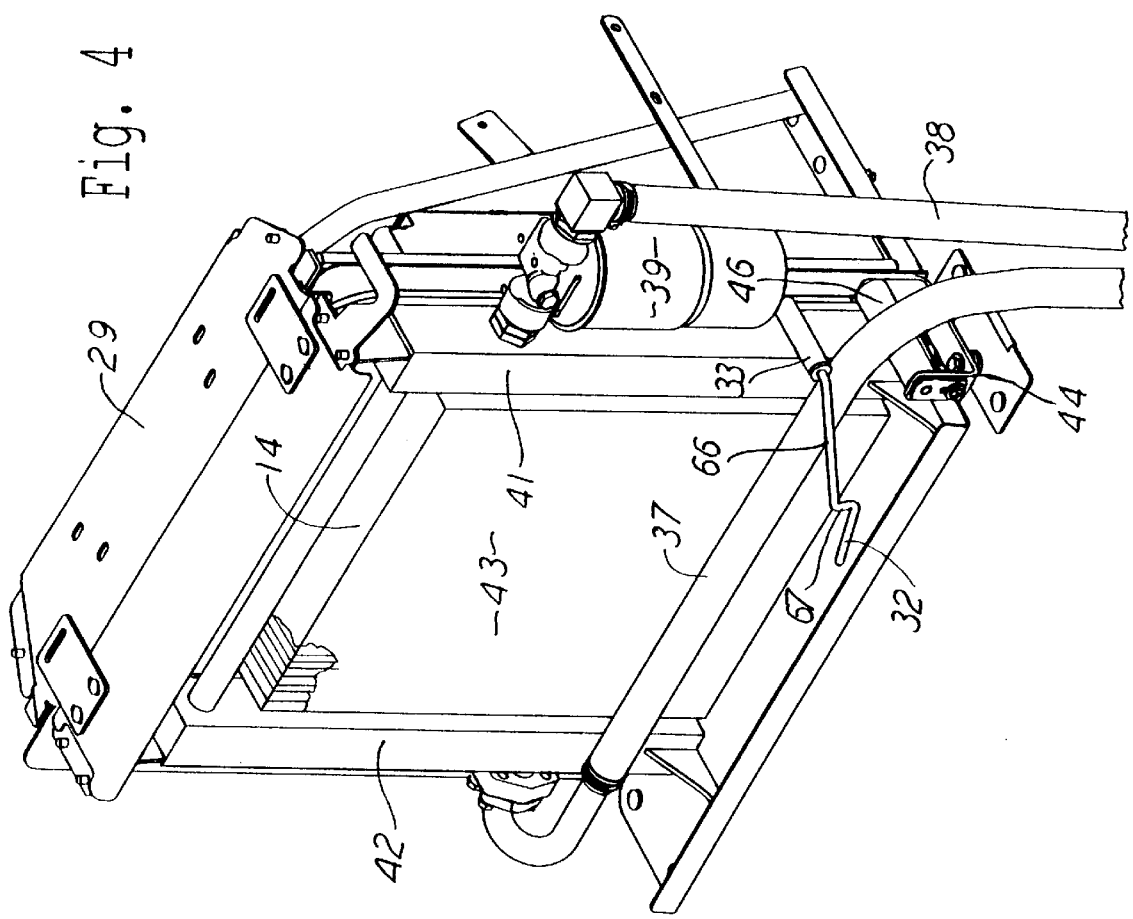

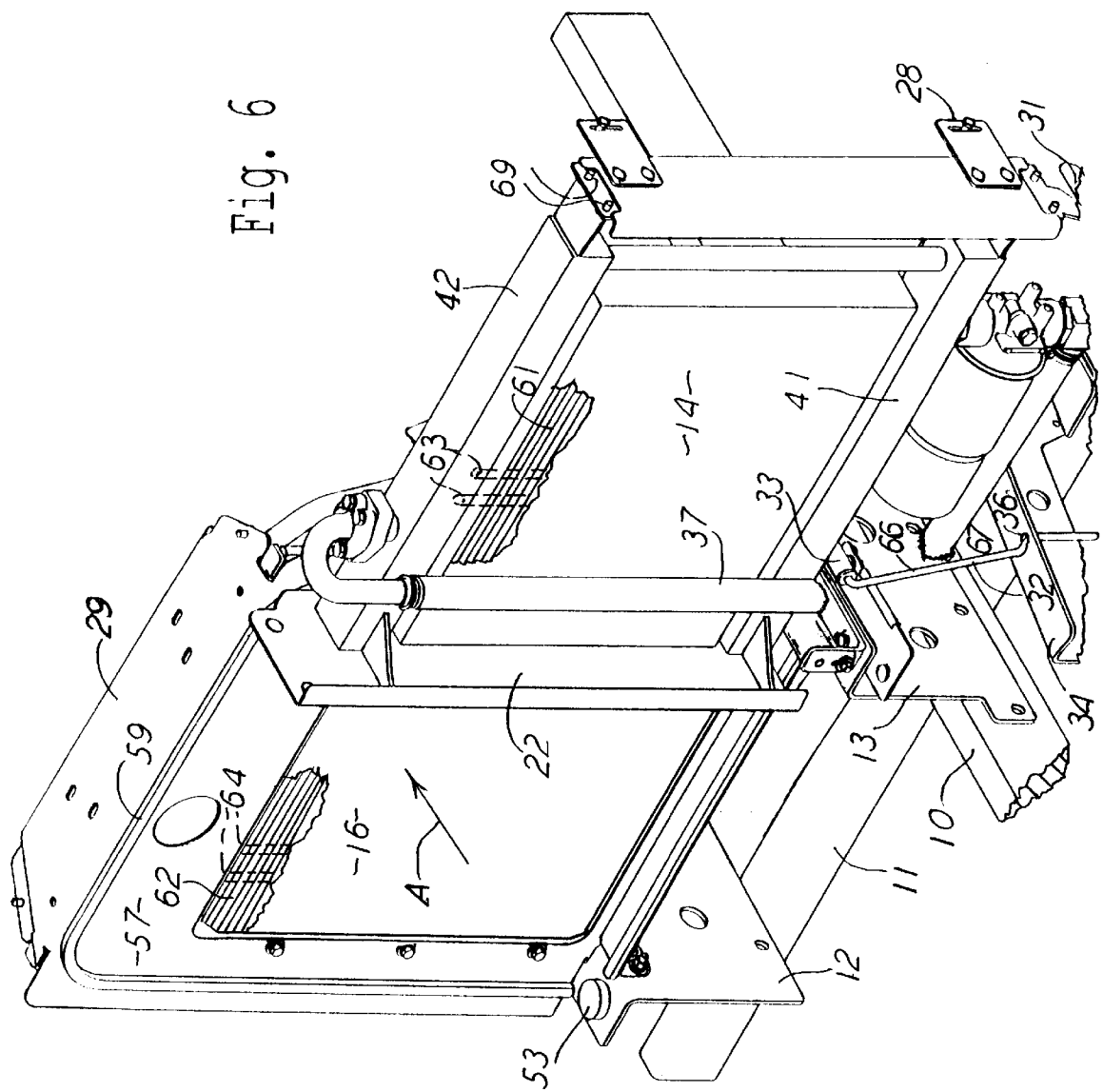

OIL COOLER MOVABLY SUPPORTED ON A VEHICLE AND METHOD FOR SAME

This invention relates to an oil cooler movably supported on a vehicle, and a method, and, more particularly, it relates to a movable support for an oil cooler on a vehicle such as a tractor which is subjected to dust and debris in its normal operation.

BACKGROUND OF THE INVENTION

In various types of road vehicles, it is conventional to have a radiator and an oil cooler as functional heat exchangers mounted on the vehicle for their respective functions of cooling the engine water and cooling the oil utilized for various functions. The cooler and radiator are usually disposed in aligned tandem positions where the cooler is located in front of the radiator. Both exchangers are disposed to have the path of cooling air directed so that the air moves axially through the cooler and directly therefrom and through the radiator which is located immediately behind the cooler relative to the air flow direction. In that conventional arrangement, both the cooler and the radiator are in confined spaces which do not permit access to either exchanger for the purpose of cleaning the dust and debris which normally moves in the cooling air and over the heat exchange surfaces of the cooler and the radiator. As such, the efficiencies of those exchangers are impaired in that the cooling tubes and fins accumulate insulating debris thereon.

There have been arrangements of coolers and radiators, in tandem assembly, and with either or both of those exchangers being movable to inoperative positions where they are at least somewhat exposed for purposes of maintenance, such as cleaning. However, those installations are of special arrangements which require sufficient space, along with very elaborate mountings, for purposes of moving either or both of the cooler and radiator to the inoperative and thereby cleaning positions. Such prior art arrangements are shown in the U.S. patents disclosed herewith.

The present invention relates to an improvement upon the prior art, such as that mentioned above and disclosed herewith. Particularly, it relates to the movable mounting of an oil cooler on a vehicle, such as a tractor, such that the cooler can be placed into an inoperative position for purposes of maintenance, such as cleaning.

In the disclosure for this particular invention, the cooler is disposed in tandem with the radiator and in its usual limited fore-and-aft space, relative to the direction of the passage of cooling air therethrough, and the cooler is mounted to be movably supported for movement between its operative and its inoperative maintenance positions.

Further, in the present arrangement, the tandem relationship between the cooler and radiator can be altered to where they are separated from each other so that they are in side-by-side position, rather than the original and operative tandem positions. As such, both the oil cooler and the radiator are accessible for purposes of maintenance, such as the cleaning mentioned. In that arrangement, one of the two exchangers is moved to the inoperative position, and it is mechanically supported in that inoperative position during the maintenance procedure. Further, the fluid lines connected to the movable exchanger can remain connected when that exchanger is moved between the operative and inoperative positions. That is, only a minimal of maneuvering and mechanical adjustments are required to position the movable exchanger between the operative and inoperative positions.

Still further, the assembled arrangement is such that an air-filter screen is positioned in front of the cooler, relative to the flow of cooling air, and the screen itself can be readily removed for purposes of cleaning, and that removal is accomplished without moving either of the two exchangers.

In general, there is an arrangement of two exchangers in tandem position and occupying their respective vertically clear spaces defined by the vertical planes extending along each exchanger's front and rear extents, and the exchanger is movable in its own vertical space, for purposes of exposing the faces of both exchangers for the maintenance purposes mentioned. Throughout, the hoses connected to the movable exchanger need not be disconnected in that they are flexible hoses which readily move between the operative and the maintenance positions while connected. In this arrangement, it should be understood that the exchanger-supporting vehicle is usually a tractor which operates in dusty and debris laden conditions and thus the cleaning of the exchangers can be convenientally carried out even on a daily basis, and therefore the expedient and easily accomplished feature of moving one of the exchangers out of its tandem position is accomplished and is important in this invention.

The invention includes the method of movably supporting a heat exchanger on a vehicle and arranging for movement of the heat exchanger within the confines of its own original vertical space, and with the movable support continually supporting the exchanger in both the operative and inoperative positions and in the path of movement therebetween.

BRIEF DESCRIPTION OF THE DRAWINGS

FIG. 1 is a front perspective view of the assembled two exchangers in this invention, and with parts of the supporting tractor also being shown.

FIG. 2 is a side elevational view of FIG. 1.

FIG. 3 is an exploded view of FIG. 1, and with the radiator omitted.

FIG. 4 is a front perspective view of a portion of that shown in FIG. 1 and with the parts thereof removed.

FIG. 6 is a front perspective view of the assembly of FIG. 1, but with parts removed and added and with the oil cooler shown in its inoperative or cleaning position.

DETAILED DESCRIPTION OF THE EMBODIMENT AND METHOD

Figure 5:
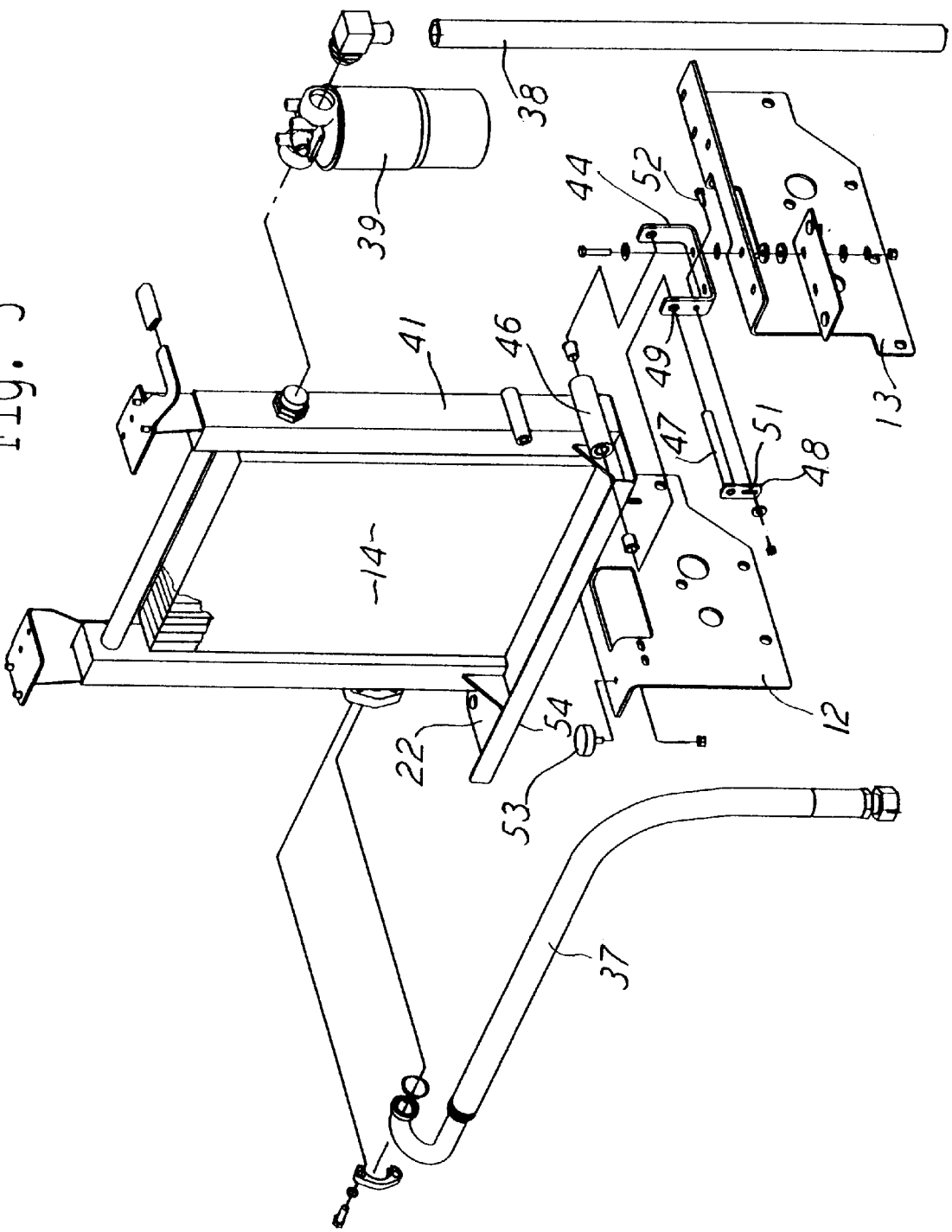
FIG. 5 is an exploded view of FIG. 4, with parts removed and added thereto.

In the following description of the structure, the disclosure of the method is inherently included therein.

While a full vehicle, or tractor, is not shown in the drawings, it will be readily understood by one skilled in the art that the vehicle can be a tractor with a frame beam 10 extending in the fore-and-aft direction of ground-movement of the tractor, and there are a cross piece 11 and upwardly extending frame pieces 12 and 13, all as shown between FIGS. 6 and 5, for instance. In further general comment, there is an oil cooler diagrammatically shown at 14, and there is a radiator, diagrammatically shown at 16 in FIGS. 2 and 6.

Thus, the cooler 14 and the radiator 16 are upwardly supported on the vehicle or tractor frame, and they are in tandem position relative to the air flow designated A in FIG. 6, and the cooler is in the forward position and the radiator is in the rearward position. FIG. 2 shows the radiator support tower 17 suitably mounted on the vehicle frame and extending into position to support the radiator 16 along with the air shroud 18 wherein the air fan can be located for purposes of drawing the air in the direction of the arrow A and first over the cooler 14 and then over the exchanger 16.

The aforementioned is generally conventional, and, as such, it will be readily understood by anyone skilled in the art.

FIGS. 1, 2 and 3 show right and left side covers 19 and 21 which releasably snap onto the sides of the cooler 14, and orientation of right and left is relative to the forward direction of vehicle movement, which is generally leftwards in all views. Also, a bottom support plate 22 and top plate 23 are affixed to the cooler 14. The arrangement is such that the forward and rearward extents of the cooler assembly, as mentioned, lie within the vertical planes designated B and C, of FIG. 2. Relative to all of the unshown remainder of the vehicle, there is no structure on the vehicle between the vertical planes B and C and in the path of the movement of the cooler 14, with its attached parts as described, between the lowered operational position of FIGS. 1 and 2 and the displaced inoperative or maintenance position of FIG. 6. That is, the cooler and its attached parts are free to move in the space between the vertical planes B and C because there is a clear space therebetween and that space is free of any other part of the vehicle which would inhibit movement of the cooler between the operative and inoperative maintenance positions mentioned.

With the arrangement described for the free movement of the cooler in the vertical space open to it, the cooler and the radiator can be positioned in the side-by-side position of FIG. 6, and then both the cooler 14 and the radiator 16 are exposed for maintenance purposes, particularly for cleaning. It is preferred that they be cleaned by blowing air therethrough, at least initially, and then perhaps a stream of water can be applied to either or both for the final cleaning.

The assembled cooler has its attached base plate 22 and its attached top 23 which can be bolted onto the cooler proper, and it also has the attachment plates 24 and 26 and plates 27 and 28. A full width top plate 29 is attached to the radiator tower. A handle 31 is on the plate 26 for the purpose of manually tipping the cooler from its upright or operative position to its inoperative and offset position as shown in FIG. 6. In that inoperative position, a pivotal support 32 is pivotally suported in a sleeve 33 to the side of the cooler and it engages a frame rail 34 fixed on the vehicle, as seen in FIG. 6, for upwardly supporting the cooler assembly in its tipped or inoperative position. As such, the support 32 is a rod pivoted on the sleeve 33 affixed to the cooler and the rod 32 extends to enter a hole 36 in the frame 34. Also, in the operative position, such as seen in FIG. 4, the support 32 is in a pivoted position which extends over a cooler hose 37 to press on the hose and thereby secure the hose 37 in the operative position.

When it is decided to tip the cooler assembly, then the rod support 32 can be swung off the hose 37 to release the flexible hose 37 which can then be moved to the inoperative position mentioned, along with the pivoting of the cooler. FIG. 3 shows there is a pin 38 which extends through the rod 32 at the rearward end of the sleeve 33 for holding the rod 32 onto the sleeve 33, and the pin 38 can be readily removed from the rod 32 to release the rod 32 from the sleeve 33, as desired. The rod 32 can then be positioned for purposes of upwardly supporting the assembled cooler in the FIG. 6 position. In that manner, the support 32 serves the dual purpose of securing the hose 37 and also upwardly supporting the cooler assembly.

The cooler also has another flexible hose 38 fluid-tightly connected therewith, and that is through a connection with a fluid filter 39 which is on the cooler manifold 41. In the normal flow of cooling oil, the flow is through the hose 37 and into the cooler manifold 42 and then across the cooler coil 43 and into the manifold 41 and the filter 39, and the flow continues out the hose 38 and back to an unshown oil tank.

For the movable, and in this instance pivotal, support of the cooler assembly described above, there is a bracket 44 on the tractor frame piece 13, and it is upstanding to extend at opposite ends of a hollow sleeve 46 affixed to the cooler manifold 41, as shown in FIG. 5. A pivot pin 47 on a plate 48 extends through openings 49 in the bracket 44 and through the sleeve 46. The plate 48 is affixed to the upstanding bracket 44. As such, the pin 47 is attached relative to the tractor frame, and the sleeve 46 can rotate therearound for positioning the oil cooler in its upright and operative position and in its offset and inoperative cleaning position. Throughout it all, the support comprised of the parts 44, 46, and 47 upwardly support the oil cooler assembly, in both the operative and inoperative positions as well as in the intermediate positions for movement of the oil cooler assembly, all as mentioned throughout.

It will also be noticed that the plate 48 has a vertical slot 51 into which a securing screw 52 can be placed. Unshown shims can be placed under the bracket 44 to adjust, if desired, the parallelism of the cooler to the radiator.

An upright support, in the form of a resilient bumper 53, is affixed to the tractor frame 12, and is directly underneath the oil cooler base plate 22 to also upwardly support the oil cooler in its operative position and on a level arrangement with the support rendered by the sleeve 46 and its vertically adjustable and inserted pin 47. The cooler underneath the surface 54 of the lower plate 22 rests downwardly on the cushion abutment 53 for upwardly supporting the cooler.

Adjacent the radiator 16, in addition to the radiator tower 17 and fan shroud 18, there is a conventional fan 56 disposed within the shroud 18, all for drawing the air firstly over the cooler and then over the radiator, in the conventional arrangement for axial flow of the cooling air. FIG. 6 shows the radiator tower 17 includes an upstanding wall 57 disposed between the cooler and radiator, and the top plate 29 is attached therewith and extends over the radiator 16 Also, there is an air seal 59 which extends on the face of the plate 57 and intermediate the cooler and the radiator for precluding the flow of air other than in the direction of the arrow A. In the movement of the cooler 14 between the operative and inoperative positions, the cooler is arranged to have a planar face disposed on a vertical plane and thereby move vertically over the seal 59 which then extends between the cooler and the radiator for the air sealing mentioned.

In the inoperative or cleaning or maintenance position shown in FIG. 6, it will be seen and understood that both the cooler 14 and the radiator 16 have respective cooling members, such as fins 61 and 62, and they also have respective tubes, such as tubes 63 and 64 indicated in dotted lines in FIG. 6. The fin and tube arrangements are conventional, and so also is the arrangement of the attending parts of both the cooler and the radiator with regard to the passage of cooling liquid therethrough and the cooling air passing thereover.

In the operative position in FIG. 4, the stand or support 32 is shown to be angled immediately adjacent the sleeve 33 and it thus has an intermediate extent 66 which overlies the hose 37 to hold the hose in the position shown in FIG. 4.

Next, when it is desired to move to the inoperative position, the stand 32 can be swung upwardly and away from the hose 37 which is then flexible enough to be maneuvered over the stand 32 to permit the cooler 14 to be swung to its inoperative position of FIG. 6. Further, the stand 32 is shown to have an offset at 67 adjacent the tractor frame opening 36 to thus assure that the stand 32 remains erect and upward in the FIG. 6 position.

The fore-and-aft extent of the cooler 14, relative to the direction A of airflow, is basically within the vertical planes B and C, as seen in FIG. 2, including the horizontal projection of the attached plates 27. Therefore, there is no structural obstruction on the unshown remainder of the tractor to preclude the pivotal movement of the cooler 14, as described herein.

As previously indicated, the covers 19 and 21 can be removed from the cooler, and the covers 19 and 21 are preferably of plastic and slightly flexible and actually snap onto and off from the respective sides of the cooler 14. Thus, the covers have two holes 68 in the tops thereof, and two matching pins 69 are on the top of the cooler 14 at the respective sides thereof for engaging the holes 68 and holding the top of the respective covers to the cooler. Likewise, there are pins and holes interconnected between the bottom of the cooler and the bottom of the side covers 19 and 21, as indicated in FIG. 3. Also, there is a pull tab 71 on the top of the cover 21 so that the operator can grasp the tab 71 and simply pull up and outwardly on the cover 21 to remove the cover from the cooler.

One purpose for removing the cover 21 is to have access to an air screen 72 which overlies the front face of the oil cooler 14, such as shown in FIGS. 1 and 3. The screen 14 can be slid laterally off the cooler and can then be taken separately for cleaning and also for exposing the front face of the cooler 14 for its cleaning. In the assembly relative to the screen 72, there are four resilient sealing pieces, made of plastic and of foam material, and they are suitably affixed to the four sides of the cooler 14. The top and bottom plastic pieces are designated 73 and 74, and they have slots 76 therealong and plastic pieces 73 and 74 thus slide on the inturned flanges 77 and 78, respectively on the top cooler piece 23 and the bottom piece 22. Thus, the screen 72, with the attached air-sealing strips 73 and 74 slide over the flange 77 on the piece 23 and over the flange 78 on the piece 22, all for air sealing between those cooler frame pieces 22 and 23 and the screen 72. Further, the screen 72 has two additional foam strips 79 and 81 affixed to the upright sides of the screen 72 for abutting the inner walls of the respective side covers 19 and 21 and to thereby seal at those locations so that no air flows around the screen 72 but all air will be restricted to go through the screen 72.

With that arrangement, the cover 21 can be readily removed, without the requirement of any tools, and the screen 72, along with its sealing strips mentioned, can be slid off the frame pieces 22 and 23 and the screen can then be cleaned, as desired.

An upright wall 82, serving as a sound and protection barrier, is disposed immediately in front of the oil cooler 14 and is actually between the operator's seat (unshown) and the cooler and is virtually in the position of the back of the operator's seat. As such, it serves to direct the air flow inwardly from the left and right edges of the cooler and radiator assembly, and it baffles the sound coming from the fan and unshown but customary powered engine disposed to the right of the assembly, as viewed in FIG. 2. The upright plate 82 has a lower baffle portion 83 and an integral upward and horizontally extending portion 84. The lower portion 83, as seen in FIG. 2, extends from the area of the unshown tractor floor or driver's seat and to a position underneath the cooler 14, and, as such, it precludes the flow of dust and other debris upwardly and into the screen and assembled cooler and radiator. Also, the upper portion 84 is held in position by means of two T-handle screws 86 which engage the cooler plates 27 and thus fasten the baffle 82 at its top. Release of the T-screws 86 permits the removal of the entire barrier 82 and therefore the pivot of the oil cooler to the maintenance position mentioned.

The lower baffle 83 is suitably anchored with the unshown floor of the vehicle and is also snug with the cooler, as indicated in FIGS. 1 and 2. The lower edge 87 of the member 82 is releasably but securely nested in the baffle 83 to be stable with the vehicle. The top 84 is then fastened by the screws 86 to the top of the cooler to releasably secure the baffle 82 in position.

The plate 29, being a part of the radiator tower 17 and thus being affixed to the tractor in any conventional manner, serves to anchor the cooler in its operative position. Thus, the screws shown with the T-handle 86 extend through the baffle top 84 and through the plates 27 affixed to the cooler 14, and into the fixed panel 29, to thereby stablize the cooler in the operative position, while the installation is readily releasable.

It will now be seen and understood that the assembled heat exchangers, along with the air intake screen 72, are useful in an environment where there is considerable dust and debris, and thus the barrier 83 initially baffles that dust and debris and next the screen intercepts the same. Further, the screen 72 is readily removed, simply by sliding laterally, for purposes of maintenance and cleaning. Also, the cooler 14 can be moved to its cleaning position as shown in FIG. 6, and that is readily accomplished, all without the requirement of any tools for releasing any parts. Of course once the cooler 14 is positioned laterally as in FIG. 6, then the radiator 16 is also exposed for purposes of cleaning. It is preferred that the cleaning initially be with pressurized air, and then subsequently, perhaps after the exchangers have cooled, water can be used for cleaning, if desired.

The cooler and the radiator are at least generally rectangular in shape transverse to the flow of the cooling air passing therethrough. Also, the axis of the pivot pin 47 is parallel to the path of the flow of the cooling air, and the pin 47 is at the lower corner of the cooler.

What is claimed is:

1. In a tractor of the type having a mobile frame and an engine, with a horizontally disposed longitudinal axis, and a radiator and an oil cooler with both extending predominantly in respective upright planes and with the radiator and the cooler being arranged with each having vertically disposed air-flow entrance and exit faces disposed transverse to said axis for the flow of cooling air through said radiator and said cooler along a cooling air-flow passageway extending along said axis and with said radiator and said cooler being spaced from each other along said axis in air-flow tandem position, the improvement comprising said cooler being supported on said tractor clear of any obstruction within a vertically oriented space lying within the vertical planes disposed transverse to said air-flow passageway and on which the extents of said cooler are disposed, a mounting on said tractor for movably supporting said cooler thereon and being arranged for movably supporting said cooler for movement of said cooler within said space and relative to said radiator and out of tandem relation therewith, fluid-conducting hoses connected to said cooler and being arranged to move with the aforesaid movement of said cooler without being disconnected from said cooler, and said mounting is interconnected between said tractor frame and said cooler and is a pivotal mounting having a horizontally disposed pivot axis, and said mounting is arranged to remain interconnected while said cooler is being moved relative to said radiator.

2. The entire subject matter, as claimed in claim 1, including a stop on said tractor for engaging said cooler and upwardly supporting said cooler when said cooler is in the tandem position relative to said radiator.

3. The entire subject matter as claimed in claim 2, including a fixture mounted on said tractor and disposed to engage said cooler when said cooler is in the tandem position relative to said radiator and with said fixture being disposed to engage said cooler at an upper portion of said cooler and thereby restrict movement of said cooler in both directions relative to said air-flow passageway.

4. The entire subject matter as claimed in claim 1, including a handle attached to said cooler for grasping by an operator for the movement of said cooler.

5. The entire subject matter as claimed in claim 1, wherein said cooler is attached to said mounting and is arranged to remain attached to said cooler throughout the movement of said cooler in said space and is arranged to upwardly support said cooler throughout said movement, and said hoses have ends which are connected to said cooler at locations on said cooler and with the lengths and dispositions of said hoses being arranged to have said ends move with said cooler in the directions of movement of said cooler in said space to thereby have said hoses remain connected to said cooler during said movement.

6. The entire subject matter as claimed in claim 5, wherein said mounting is a pivotal mounting having a horizontally disposed pivot axis.

7. The entire subject matter as claimed in claim 6, wherein said hoses are disposed on said tractor clear of any obstruction within a vertically oriented space extending in the vertically projected space wherein said hoses are disposed.

8. The entire subject matter as claimed in claim 1, including a support attached to said cooler and arranged to be upwardly supported by said tractor frame for upwardly supporting said cooler in the inoperative position.

9. The entire subject matter as claimed in claim 1, including a cover releasably attached to said cooler and extending over a portion thereof at a location adjacent to said air-flow passageway and being of an extent to enclose said portion.

10. The entire subject matter as claimed in claim 9, including snap fasteners inter-engaged between said cooler and said cover for holding said cover on said cooler and being releasable without the need of the application of any tools.

11. The entire subject matter as claimed in claim 1, including an air filter screen mounted on said cooler and extending thereover in a position for the filtering of cooling air moving in said air-flow passageway, and a holder on said cooler and engaged with said screen and being arranged for releasably holding said screen in the air filtering position and for release therefrom without the need of the application of any tools.

12. In a tractor with heat exchangers, the improvement comprising a frame included in said tractor, two heat exchangers of the type subject to cooling by the flow of cooling air thereover when in the path of the flow of the cooling air and thereby being in the operative position and being disposed on said frame in tandem positions relative to said path of flow and to each other, a movable support mounted on said frame and being arranged for movably supporting a first one of said heat exchangers upwardly on said frame in said tandem position and subsequently in an inoperative position out of the path of the flow of cooling air in a side-by-side position relative to a second one of said heat exchangers, and being arranged for upwardly supporting said first one of said heat exchangers throughout the movement between the aforesaid two positions, said movable support is interconnected between said tractor frame and said first one of said heat exchangers and is a pivotal support having a horizontally disposed pivot axis disposed parallel to said path of air flow and said support is arranged to remain interconnected while said first one of said heat exchangers is in both said operative and inoperative positions and while being moved therebetween, said tractor presenting a vertically extending open space vertically projected transverse to said path of cooling air flow and between the vertical planes lying on the limits of the extreme extents of said first one of said heat exchangers along said path of flow and when said first one of said heat exchangers is in the operative position, said tractor being arranged to have an absence of any portion thereof extending into said vertically extending open space and thereby present an unobstructed space for the movement of said first one of heat exchangers through said open space, and fluid-conducting hoses connected to said heat exchanger and being flexible and free to move with said heat exchanger between said operative and inoperative positions without being disconnected from said heat exchanger.

13. The tractor with heat exchangers, as claimed in claim 12, including a stop on said frame and disposed underneath said first heat exchanger and upwardly supporting same when said first heat exchanger is in said operative position.

14. The tractor with heat exchangers, as claimed in claim 13, including a fixture on said tractor disposed to engage said first heat exchanger when said first heat exchanger is in said operative position, and with said fixture being disposed to engage said first heat exchanger at an upper portion of said first heat exchanger and being arrange to restrict movement of said first heat exchanger relative to said frame.

15. The tractor with heat exchangers, as claimed in claim 12, including
an air filter screen mounted on said first heat exchanger and extending thereover in a position for filtering cooling air moving in said air flow path, and
a holder on said first heat exchanger and being arranged for releasably holding said screen in the mounted air-filtering position and for release therefrom without the need of the application of any tools.

16. The tractor with heat exchangers, as claimed in claim 12, including
a support attached to said first heat exchanger and arranged to be upwardly supported by said tractor frame for upwardly supporting said first heat exchanger in the inoperative position.

17. A method for mounting and moving a heat exchanger relative to a tractor on which the heat exchanger is supported, comprising the steps of
movably supporting said heat exchanger on said tractor in an operative position in tandem with another heat exchanger which is on said tractor and to have cooling air flow through both said exchangers along an air-flow path,
locating said movable heat exchanger on said tractor in a position where there is unobstructed vertical space projected vertically from the space occupied by said movable heat exchanger while in its operative position,
pivoting said movable heat exchanger on a pivotal mounting for support in and movement from said operative position and to an inoperative position in side-by-side relationship with said other heat exchanger and thereby expose both said heat exchangers for the purpose of cleaning them, and
upwardly supporting said movable heat exchanger in said inoperative position through both said pivotal mounting and a support spaced from said pivotal mounting.

18. The method for mounting and moving a heat exchanger relative to a tractor, as claimed in claim 17, including the steps of
releasably attaching an air filter screen onto said movable heat exchanger and being arranged for attachment and detachment relative to said movable heat exchanger without the need for the application of any tools.

19. In a tractor with heat exchangers, the improvement comprising
a frame included in said tractor,
two heat exchangers of the type subject to cooling by the flow of cooling air thereover when in the path of the flow of the cooling air and thereby being in the operative position and being disposed on said frame in tandem positions relative to said path of flow and to each other,
a movable support mounted on said frame and being arranged for movably supporting a first one of said heat exchangers upwardly on said frame in said tandem position and subsequently in an inoperative position out of the path of the flow of cooling air to a side-by-side position relative to a second one of said heat exchangers, and for upwardly supporting said first one of said heat exchangers throughout the movement between the aforesaid two positions,
said movable support is a pivotal mounting attached to said first one of said heat exchangers and is disposed with the pivot axis parallel to said path of flow of cooling air and is arranged for pivotal support of said first one of said heat exchangers throughout said two positions and the movement of said first one of said heat exchangers,
said tractor presenting a vertically extending open space vertically projected transverse to said path of cooling air flow and between the vertical planes lying on the limits of the extreme extents of said first one of said heat exchangers along said path of flow and when said first one of said heat exchangers is in the operative position, and
said tractor being arranged to have an absence of any portion thereof extending into said vertically extending open space and thereby present an unobstructed space for the movement of said first one of heat exchangers through said open space.

20. The tractor with heat exchangers as claimed in claim 19, wherein
said pivotal mounting is disposed underneath said first one of said heat exchangers for pivoting said first one of said heat exchangers upwardly relative to said pivotal mounting.

21. The tractor with heat exchangers as claimed in claim 19, wherein
said first one of said heat exchangers is rectangular in shape in its disposition in the plane transverse to said path of the flow of the cooling air, and
said movable support is located at one lower corner of the rectangular shape of said first one of said heat exchangers for pivotal movement of said first one of said heat exchangers about said one lower corner.

* * * * *